(12) United States Patent
Davidoff

(10) Patent No.: US 11,799,661 B1
(45) Date of Patent: Oct. 24, 2023

(54) CARBON CAPTURE ADAPTER

(71) Applicant: Robert Craig Davidoff, Southlake, TX (US)

(72) Inventor: Robert Craig Davidoff, Southlake, TX (US)

( * ) Notice: Subject to any disclaimer, the term of this patent is extended or adjusted under 35 U.S.C. 154(b) by 0 days.

(21) Appl. No.: 17/982,493

(22) Filed: Nov. 7, 2022

(51) Int. Cl.
| | |
|---|---|
| *B01D 53/14* | (2006.01) |
| *H04L 9/32* | (2006.01) |
| *B01D 27/08* | (2006.01) |
| *B01J 20/06* | (2006.01) |
| *H04L 9/00* | (2022.01) |

(52) U.S. Cl.
CPC ............ *H04L 9/3239* (2013.01); *B01D 27/08* (2013.01); *B01D 53/14* (2013.01); *B01D 53/1475* (2013.01); *B01J 20/06* (2013.01); *B01D 2201/54* (2013.01); *B01D 2253/112* (2013.01); *B01D 2257/504* (2013.01); *H04L 9/50* (2022.05); *H04L 2209/56* (2013.01)

(58) Field of Classification Search
CPC ..... H04L 9/3239; H04L 9/50; H04L 2209/56; B01D 53/14; B01D 53/1418; B01D 53/1475; B01D 20/06; B01D 2201/54; B01D 2253/112; B01D 2257/504
USPC .... 96/108, 111, 243, 274, 276, 329; 95/236; 423/220, 228–230, 225
See application file for complete search history.

(56) References Cited

U.S. PATENT DOCUMENTS

| | | | | |
|---|---|---|---|---|
| 8,329,458 | B2 * | 12/2012 | Parent .................... | B01D 53/84 435/296.1 |
| 2002/0072109 | A1 * | 6/2002 | Bayless ................... | C12M 25/02 423/230 |
| 2008/0087165 | A1 * | 4/2008 | Wright .................... | B01D 53/62 96/111 |
| 2011/0206572 | A1 * | 8/2011 | McKenna .......... | B01D 53/0407 96/121 |
| 2014/0186249 | A1 * | 7/2014 | Ateya Soliman ...... | B01D 53/78 423/243.08 |

* cited by examiner

*Primary Examiner* — Frank M Lawrence, Jr.
(74) *Attorney, Agent, or Firm* — Camille A. Wilson; Wilson Dutra, PLLC

(57) ABSTRACT

The present disclosure relates to a carbon capture adapter that may attach to high air flow systems. A carbon capture adapter may utilize the air flow foundations of a high air flow system to allow for capture of unfiltered ambient air, allowing for carbon removal and the scrubbing of the unfiltered ambient air. The carbon capture adapter may comprise of carbon sensors that may detect carbon levels of the air before and after the carbon has been scrubbed or removed from the ambient air. The carbon capture adapter may capture and transform the carbon into secondary substances that may be useful unto itself, even further limiting waste and environmental damage. The carbon capture adapter will have all inputs, outputs, processes, and flows that meet all aspects of a closed loop system that is specifically designed for CCS.

14 Claims, 11 Drawing Sheets

CARBON CAPTURE ADAPTER

BACKGROUND

In 1938, scientists connected the Earth's increase of carbon dioxide (CO2) in the atmosphere to global warming. While the process of CO2 and water vapor trapping heat in the atmosphere was already understood, it was not until the 20th century that scientists discovered the threat of an increase in CO2 emissions, with these long-term shifts in weather and temperature patterns coined "climate change". Climate change has become a widely discussed issue in the 21st century, with new technologies developing ways to produce clean and/or green energy. Specifically, Carbon Capture and Storage (CSS) technologies have played an integral role in reducing carbon emissions.

Typically, CSS is applied to industrial processes where CO2 is compressed and transported through pipelines to be stored in deep underground rock formations. This is used to mitigate the amount of CO2 emitted from the burning of fossil fuels and similar CO2 producing processes. Outside of these industrial applications, Carbon Capture innovators have looked towards obtaining the CO2 from the air itself. These massive air capture and storage plants assist in removing CO2 from the air on a large-scale. Unlike the CSS applied to fossil fuel burning, these new CO2 capture technologies do more than reduce the amount of CO2 released by certain activities, rather they reduce the total amount of CO2 in the atmosphere.

Still, these new air capture technologies require a source of high velocity air flow. Using large air turbines, industrial fans, and contactors, companies have found ways to extract the CO2 from the atmosphere to then concentrate it for capture and storage. This has the effect of reducing the amount of CO2 in the atmosphere while also providing revenue for these companies in the form of carbon credits. Corporations can then purchase these carbon credits to earn the right to emit a certain amount of CO2 according to regulatory requirements.

While these air capture technologies exist in the industrial setting and are expanding into these standalone facilities, there are many other sources of CO2 emissions that are being ignored by these inventions. For example, even though crypto mining assets in general do not emit carbon such as a gas-powered vehicle, the energy source itself of the mining of crypto assets generated approximately 0.4% to 0.8% of the United States greenhouse gas emissions if that source is from coal and other fossil fuel sources. These large crypto-mining machines are ignored by CSS technologies, their energy source emissions freely entering the atmosphere. This is the case for many activities and practices that people do not typically associate with CO2 emissions meaning that many non-producing CO2 industries, or industries that may consume energy sources that release CO2 in the atmosphere have the opportunity to actually reverse the process through CSS.

The difficulty for CSS and other air capture technologies is discovering a method of CO2 extraction that is both profitable and workable in these more unique CO2 producing environments. Current mechanisms are either too large and/or expensive to work in these conditions. Rather, they need a more adaptable and practical process, one that has yet to have been developed to have the process, flows, and adaptation to finally deliver the economies of scale that is needed in the CSS industry and to productize everyday use of the technology.

SUMMARY OF THE DISCLOSURE

Accordingly, the present disclosure relates to a carbon capture adapter that may attach to high air flow systems. A carbon capture adapter may utilize the air flow foundations of a high air flow system to allow for effective and efficient capture of unfiltered air, allowing for carbon scrubbing of the unfiltered air. In some embodiments, the carbon capture adapter may comprise sensors that may detect carbon levels of the air before and after the carbon has been scrubbed from the air. In some aspects, the carbon capture adapter may capture and transform the carbon into a secondary substances that may be useful unto itself, even further limiting waste and environmental damage. This carbon capture adapter may be used standalone or integrated into high air flow systems by having the input sensor and output sensor that can amplify a process through a control process through feedback allows for the first closed loop system carbon capture mechanism that is an adapter or for standalone use for industries to use for CSS.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

The present disclosure provides generally for an innovative and more effective way to remove carbon from the air, allowing for the scrubbing and air purification in reference to this also includes the management of high carbon-emitting machinery or any ambient air that carbon may be removed from. According to the present disclosure, a carbon capture adapter may attach to high flow air systems and remove a portion of the carbon from the ambient air.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

High Air Flow System: as used herein refers to any carbon delivery device that provides ambient unfiltered air to a carbon capture adapter.

Air flow or Airflow: as used herein refers to the flow of a carbon-carrying gas or liquid, wherein carbon may be captured and scrubbed from the airflow through the carbon capture adapter. Typically referred to as air, for ease of reference, but does not exclude the process of moving high volume liquids.

Figure 1:
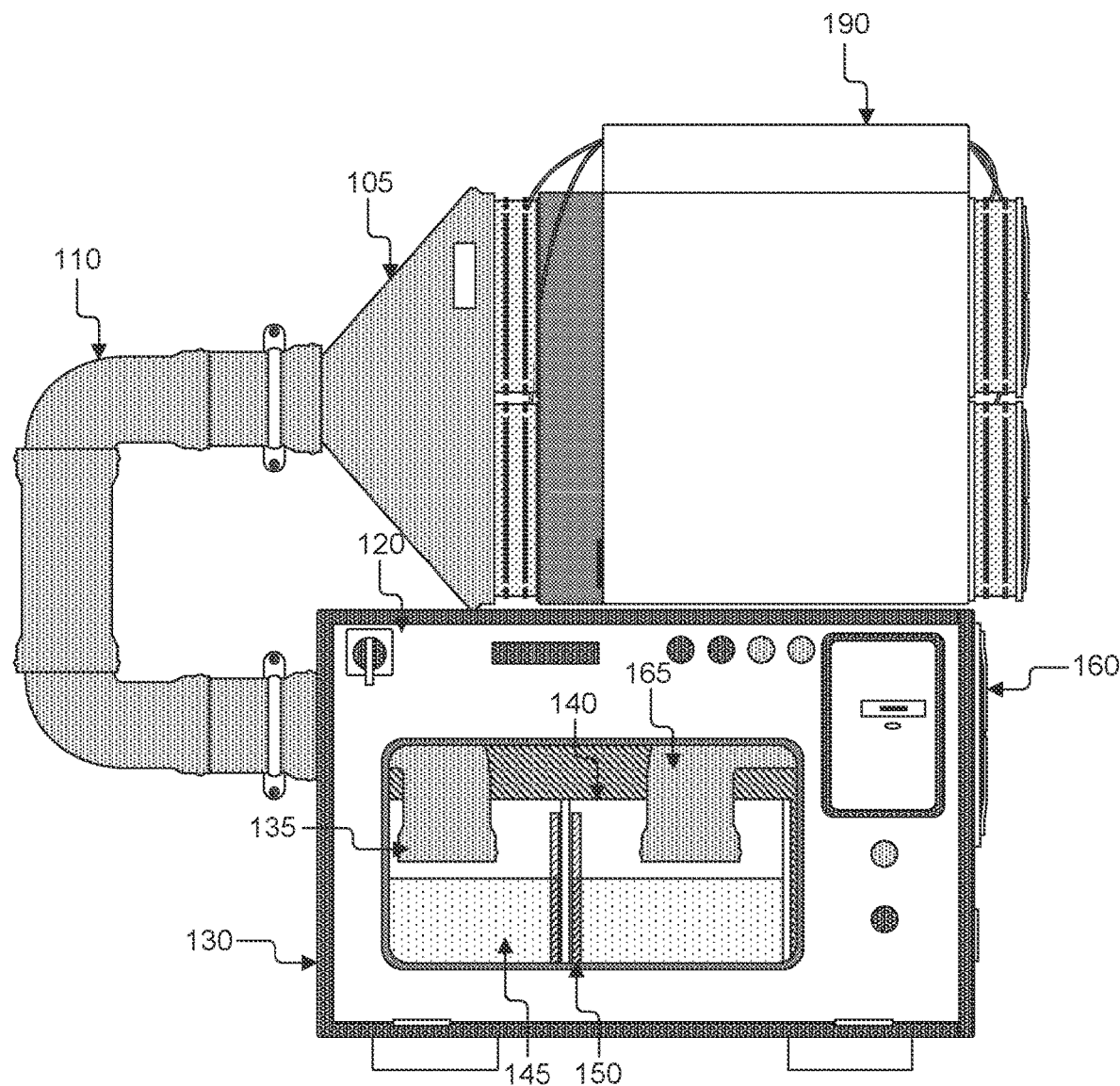
FIG. 1 illustrates an exemplary carbon capture adapter attached to a high air flow system, according to some embodiments of the present disclosure.

Referring now to FIG. 1, an exemplary carbon capture adapter 100 is illustrated, wherein the carbon capture adapter 100 is connected to the air output portion of a high air flow system 190. In some aspects, a collection portion 105 may attach to a high air flow system 190. In some embodiments, a closed loop air system 110 may be connected to the collection portion 105, wherein the ambient air received through the collection portion flows through the closed loop air system 110.

In some aspects, the carbon capture adapter 100 may comprise a carbon filtering system 120. In some implementations, the carbon filtering system 120 may comprise a container portion 130 comprising a first opening 135 and a second opening 165, wherein the first opening is connectable to the closed loop air system 110, wherein ambient air received through the closed loop air system flows through the first opening 135 into the container portion 130.

In some embodiments, the carbon capture adapter 100 may comprise a first carbon sink 140 located within the container portion 130, the first carbon sink 140 configured to contain a replaceable substance 145 that may be in an aqueous solution that will create a chemical reaction to bind with carbon as the ambient air is received from the closed loop air system 110 to create a first captured carbon substance and filtration of carbon of the ambient air as the exhaust or byproduct herein referred to as filtered air. In some implementations, the carbon filtering system 120 may comprise a removable filter 150 located within the first sink 140, wherein the filter 150 collects the first captured carbon substance; and an exit air system 160 connectable to the second opening 165, wherein the filtered air exits the carbon filtering system 120 through the second opening 165 and the exit air system 160.

Figure 2:
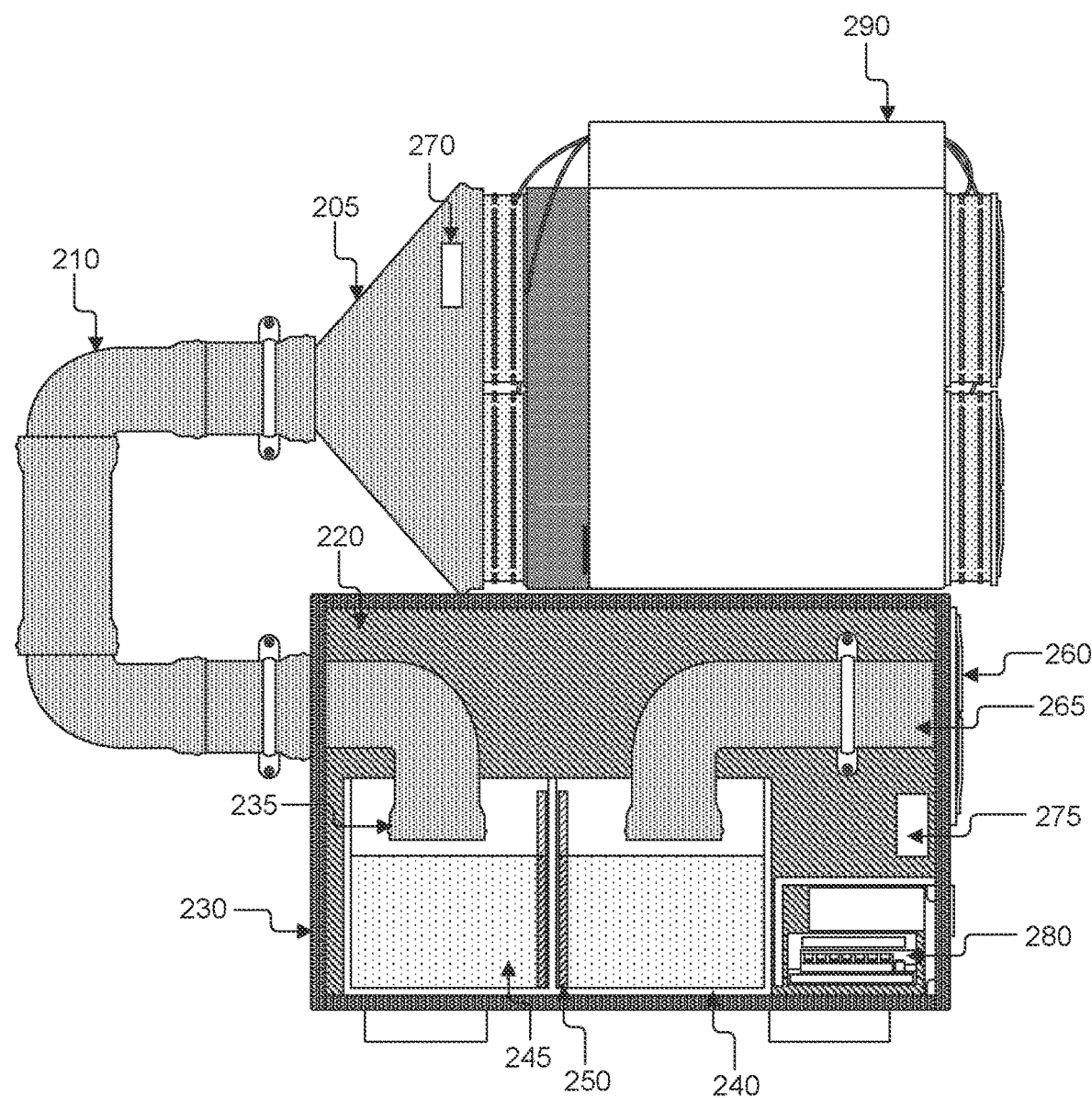
FIG. 2 illustrates an exemplary carbon capture adapter attached to a high air flow system, according to some embodiments of the present disclosure.

Referring now to FIG. 2, an exemplary carbon capture adapter 200 attached to a high air flow 290 system is illustrated. In some embodiments, an ambient air or unfiltered air sensor 270 may be located proximate to ambient, unfiltered, or polluted air, wherein the unfiltered air sensor 270 detects the carbon level in the ambient, unfiltered, or polluted air received through the closed loop air system 210.

In some implementations, a filtered air sensor 275 may be located proximate to the second opening 265, wherein the filtered air sensor, once completing the removal of carbon from the ambient, unfiltered, or polluted air, in a closed loop system 210 detects a filtered carbon level in the filtered air received through the carbon capturing system. In some aspects, the unfiltered air sensor 270 may periodically collect the unfiltered carbon level and transmit the unfiltered carbon level to the carbon data controller 280, and the carbon data controller 280 may compare the filtered carbon level to the unfiltered carbon level to calculate carbon removal data. This use of this data will allow for amplification, feedback, monitoring, error logging all critical to the performance of a closed loop system The closed loop carbon capture adapter 200 may be used as an adapter, connectable to existing applications, or may become a standalone device. As an adapter, the carbon capture adapter 200 may scrub and capture carbon on everyday life devices as an accessory. As a standalone device, the carbon capture adapter 200 may comprise of and act solely as an independent carbon air purifier by means of adding a high-volume fan, turbine for passive air movement of ambient air to enter into the closed loop system through connecting to 270 the adapter. The adapter may connect to any device that exhausts or pushes a volume of air through a chamber, exhaust, ventilation system, ambient air, or an apparatus.

This measurement of air, or air flow or volume of air passed through a device or system, such as a fan, is typically measures in units called CFM. The adapter may create a closed loop system 210 that may have the capability to measure the input and net output of carbon through the process, thus capturing a net carbon delta change from the air and removal of carbon dioxide and/or carbon monoxide from the air and exchanging it into a solid and/or liquid form. The measurement of carbon in air through the sensor it typically calculated in parts per million (ppm) or and may be used as the unit of measurement in calculating the delta change in carbon from the ambient air (input) to the filtered air (output).

By providing a reference point and feedback of output using carbon sensors 270, 275, parts of the process may be more effectively monitored and managed to create an efficient system. As non-limiting examples, data collected from the carbon sensors 270, 275 may influence fan speed, concentration of solution, electrolysis, and flow rate. Monitoring error codes through a carbon data controller 280, such as a controller, that takes the data from the carbon sensors 270, 275 to adjust a process to get the desired result of carbon capture creates a closed loop carbon capture adapter 200 that may be used standalone or attached to add onto an existing process.

The unfiltered air sensor 270 may calculate the amount of carbon in common quantitative measurements that is about to pass through the carbon capture adapter 200. It may measure the amount of carbon being passed through the carbon filtering system 220. As non-limiting examples, carbon sensors may comprise one or more of NDIR, mercury manometer, IR gas analyzer, IR gas, photoacoustic spectroscopy devices, or microelectromechanical system.

Figure 3:
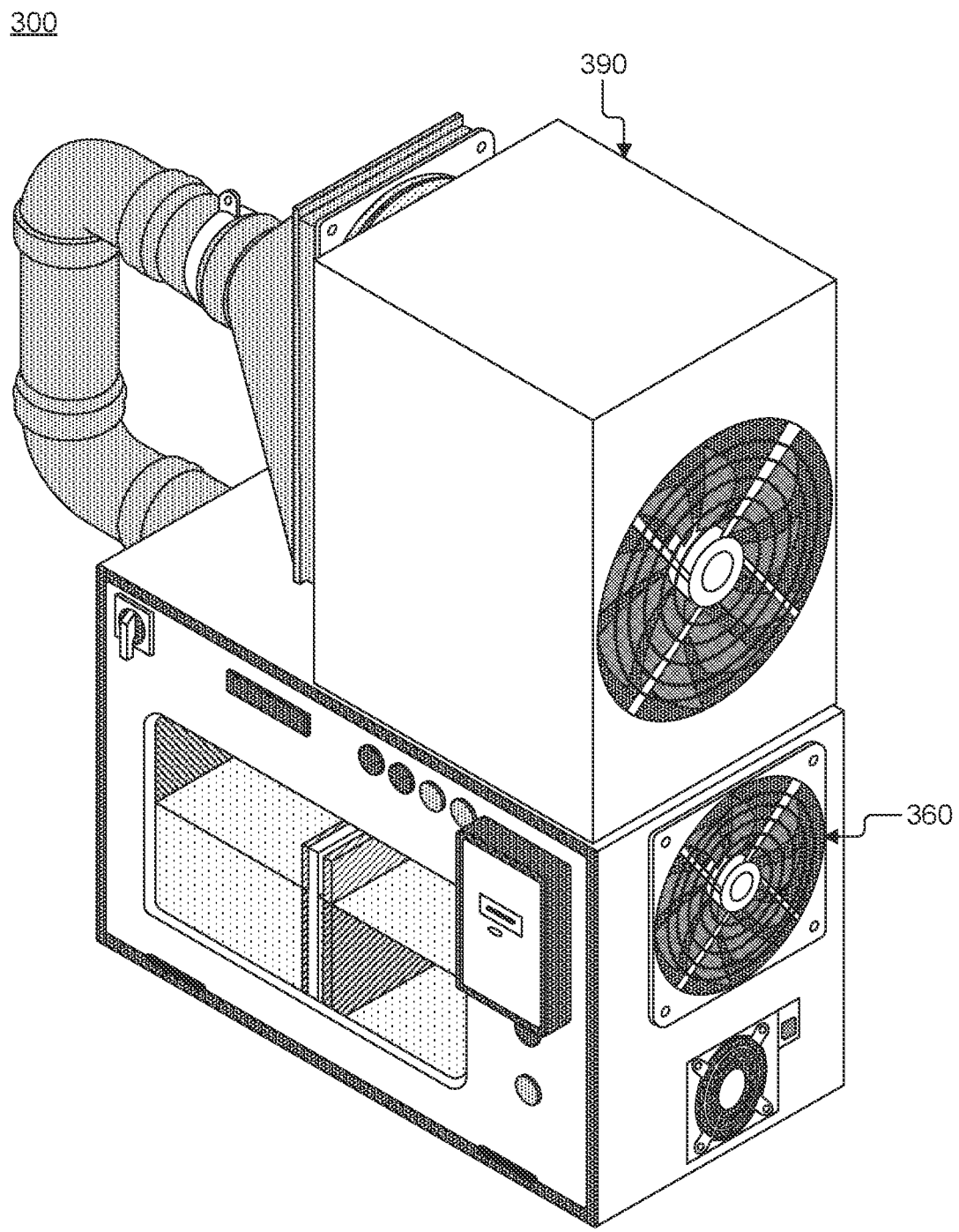
FIG. 3 illustrates an exemplary carbon capture adapter attached to a high air flow system, according to some embodiments of the present disclosure.
Figure 4:
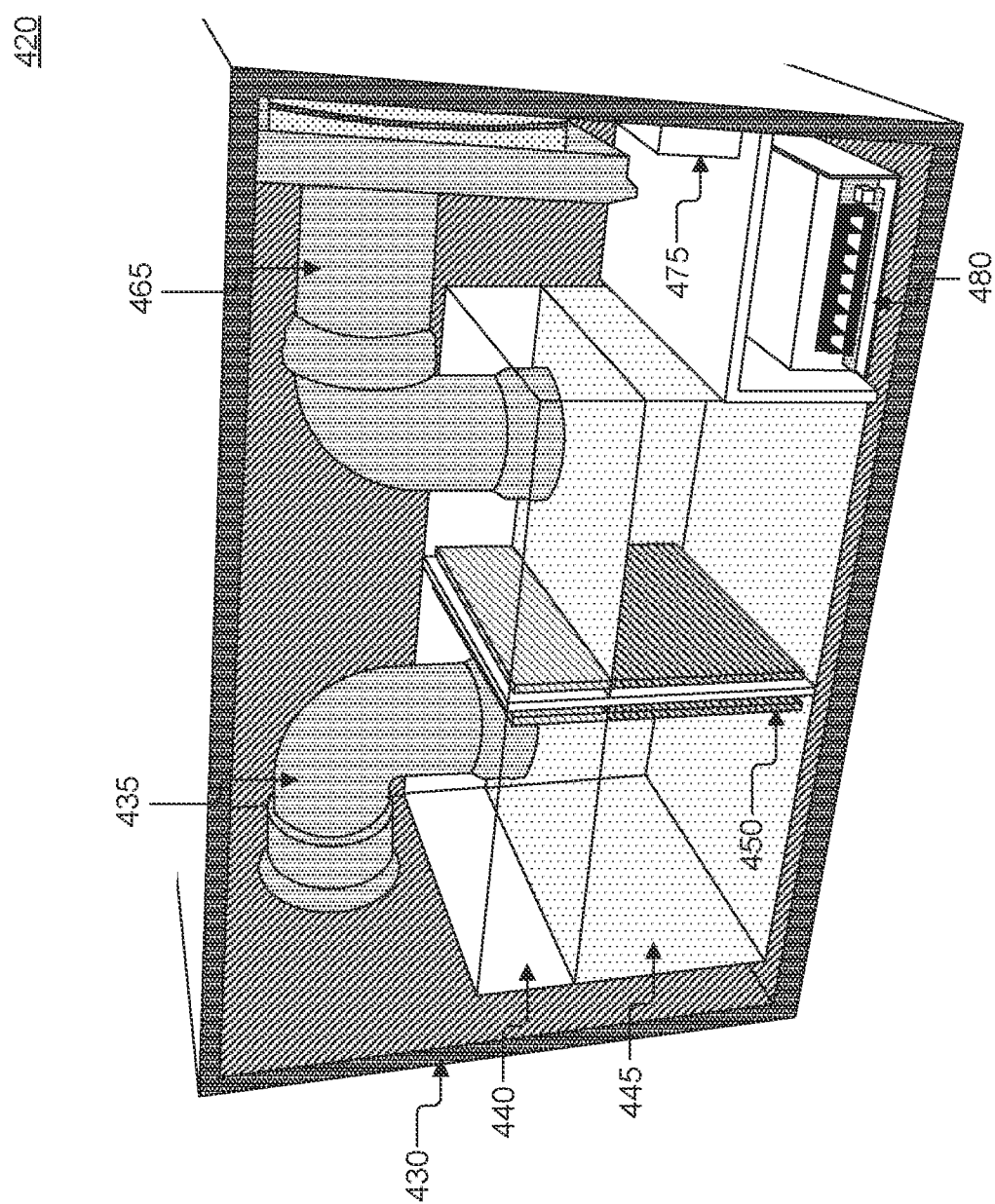
FIG. 4 illustrates an exemplary carbon filtering system for a carbon capture adapter, according to some embodiments of the present disclosure.

Referring now to FIG. 3, an exemplary carbon capture adapter 300 attached to a high air flow system 390 is illustrated. In some embodiments, the origin of input may be the primary part and start of the process. In some aspects, collection may occur through a carbon capture adapter 300, which may be connected to the original high air flow system. Any output of air volume the carbon capture adapter 300 may be plugged and connected to the high air flow system that may be pre-existing. If there is no device to attach the carbon capture adapter 300 to, the carbon capture adapter 300 itself may comprise a high-volume CFM fan and becomes the primary source and an instant carbon catcher. Comment—we can remove the miner and just show the fan and have a fan part only connected to the adapter and say that 390 can be a high-volume fan Referring now to FIG. 4, an exemplary carbon filtering system 420 of a carbon capture adapter is illustrated. In some aspects, the carbon capture adapter may comprise a carbon filtering system 420. In some implementations, the carbon filtering system 420 may comprise a container portion 430 comprising a first opening 435 and a second opening 465, wherein the first opening is connectable to the closed loop air system, wherein unfiltered air received through the closed loop air system flows through the first opening 435 into the container portion 430.

In some embodiments, the carbon capture adapter 400 may comprise a first sink 440 located within the container portion 430, the first sink 440 may be configured to contain a replaceable substance 445 to bind with carbon in the unfiltered air received from the closed loop air system 410 to create a first captured carbon substance and filtered air. In some implementations, the carbon filtering system 420 may comprise a removable filter 450 located within the first sink 440, wherein the filter 450 collects the first captured carbon substance; and an exit air system 460 connectable to the second opening 465, wherein the filtered air exits the carbon filtering system 420 through the second opening 465 and the exit air system 460.

In some aspects, an exchange of carbon may occur within the first sink, such as through chemical reaction through filtration or electrolysis. In some embodiments, the air may be mixed against aqueous solution that may contain one or more alkali metals that may have a caustic result. The next step may occur through chemical reaction, bonding/binding, electrolysis, or absorption, as non-limiting examples. In some implementations, a filter or absorber may attract and remove the carbon from the air and direct the carbon into a liquid or solid state. As non-limiting examples, the aqueous solution may comprise a hydroxide, such as potassium hydroxide, lithium hydroxide, or sodium hydroxide.

In some aspects, electrolysis may remove the carbon from the air and or liquid state. This is the process of ionization using fluids to aid, enhance, accelerate or be the primary mechanism to create an isolation and bonding result that will attract the carbon molecule to bond and go through a medium exchange process from one state to another. In some embodiments, the replaceable substance 445 may comprise a liquid that may cause algae growth.

By injecting carbon, such as carbon dioxide, into a liquid or such as water, an organic path and natural process of photosynthesis may allow carbon to be stored in its solid form and facilitate the growth of algae. In some implementations, the filter 450 may comprise microbes. For example, a microbe may be designed that once the carbon dioxide is in now in its liquid form would allow a microbe to consume the carbon dioxide. As non-limiting examples, a filter 450 may comprise a sponge, honeycomb, matrix, tubes, that may store the carbon for future extraction. This will allow for replacement of the medium itself such as a replacement filter.

In some aspects, a first sink 440 may comprise a holding tank or provide the volume or area where the reaction may occur. The first sink 440 is a plotter to allow for the filter/absorber to capture the carbon from the reaction and when the medium and carbon transfer takes please to move from the state of air to the physical solid state. This maybe where the aqueous solution resides in a holding tank area. The carbon maybe in its solid or liquid form or inside a living organism such as algae or microbes.

In some aspects, a filtered air sensor 475 may monitor the output of the carbon for the desired result. This may measure the exhaust or output of the air for the desired result and provide feedback. In the closed loop version, this sensor 475 acts as the feedback loop that can report to the carbon capture controller 480. This feedback data may be used as amplification or suppression of the carbon capture process thus creating components of a closed loop system.

In some embodiments, an extraction process of the carbon may use heat, electrolysis, and other separation techniques to remove the carbon from the medium such as a filter or the carbon sink itself. The heat may be in the form of a boiler or heat exchanger, wherein use of steam may facilitate in the extraction process. This may be an additional process. Wasted heat from the carbon emitter device such as but not limiting to the heat created from a bitcoin mining device may be captured to help in the sequestering process. For example, carbon may be separated from the aqueous solution. As another example, the resulting compound may have secondary purpose, such as Potassium Bicarbonate, Lithium bicarbonate, Sodium Bicarbonate, which may be extracted from a filter 450 and repurposed. As a still further example, the algae or microbes may be extracted. Carbon sequestering allows for the actual mining, and removal of the carbon after a period of time or replacement of filters or replacement of aqueous solution.

In some embodiments a carbon data controller 480 may take the input of the ambient or unfiltered air sensor, take the input of the filtered air sensor 475, and take the delta of the PPMs from both sensors to see the change in carbon. This may give a measurement of the actual carbon that has been scrubbed or captured from closed loop carbon capture process. By measuring the data of carbon coming in the system and out of the system, carbon credits may be quantified and objectively measured. This data may be sent to other systems in the future for carbon credit exchanges and to accurately reflect carbon capture data in real time. This will allow for integration into other processes and systems at any point in the nine-step process.

In some aspects, the carbon data controller 480 may be the primary controller and may comprise a controller board for the carbon capture adapter. The carbon data controller 480 may have the capability to have firmware, data storage, memory, IDE, interfaces, input and output peripheral, and software application programmer interface API integration to be able to send the carbon capturing data in real time to other systems and also store a history of carbon capture this controller board monitored, sent, and received data from.

In some implementations, the carbon data controller 480 may rely on a process flow of conditions based on predefined criteria of input or reference, amplifier, controller, process, and feedback, as non-limiting examples. This process flow may provide feedback for a predefined result. The system may have one or more feedback loops between its output and input carbon sensors 475 receiving and transmitting data through the controller board. The closed-loop system design will provide amplification or suppression automatically to provide the desired output of carbon by comparing it with the actual input of carbon and adjusting the process to parameters that may be set or learned over time to create an optimal reliable apparatus for CCS.

Figure 5:
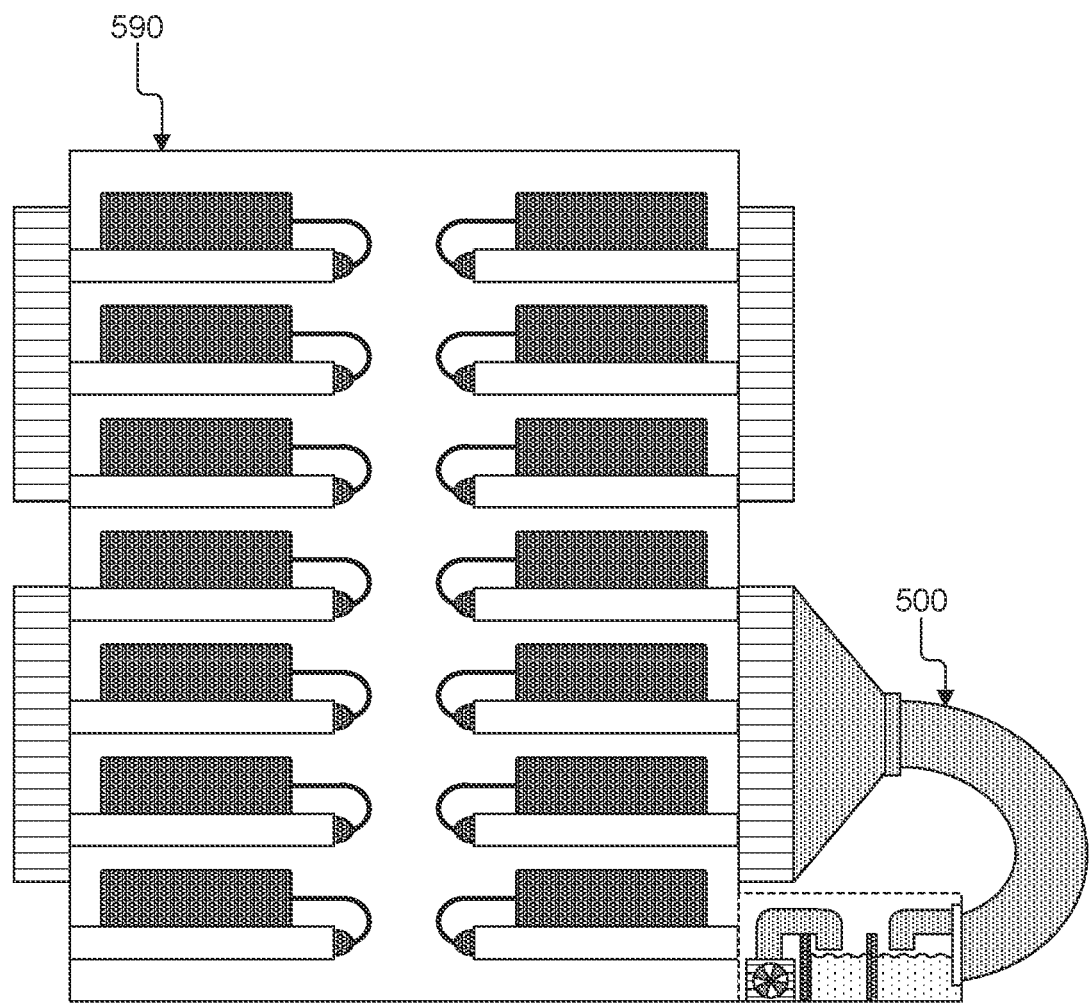
FIG. 5 illustrates an exemplary carbon capture adapter attached to a high air flow system, according to some embodiments of the present disclosure.

Referring now to FIG. 5, an exemplary carbon capture adapter 500 attached to a high air flow system 590 is illustrated. In some aspects, a high air flow system 590 may comprise a bitcoin mining container, which may contain multiple bitcoin miners in a single room or vessel or containment. In some embodiments, the high airflow system 590 may comprise a bitcoin farm or A datacenter, where large amounts of data are stored and processed, emitting large amounts of airflow. This airflow used to control the ambient temperature of the miners the adapter may be attached to the output to then integrate the process of CSS.

Figure 6:
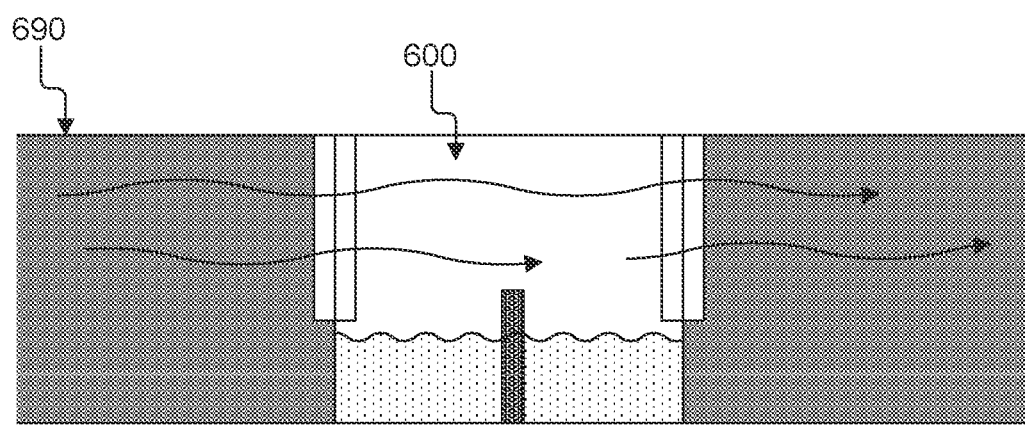
FIG. 6 illustrates an exemplary carbon filtering system attached to a high air flow system, according to some embodiments of the present disclosure.

Referring now to FIG. 6, an exemplary carbon capture adapter 600 attached to a high air flow system 690 is illustrated. In some embodiments, the high air flow system 690 may comprise ducting or tubing within a larger airflow system. This may allow for the insertion of the carbon capture adapter 600 inline with an inline carbon scrubber, filter, ducting or tubing system. For example, a carbon capture adapter 600 may be inserted inline with air conditioning ducting within a home or commercial building, as a way to remove carbon from the air. This may allow for carbon capture to become more accessible to individuals and companies that may not invest in large carbon scrubbing facilities.

Figure 7:
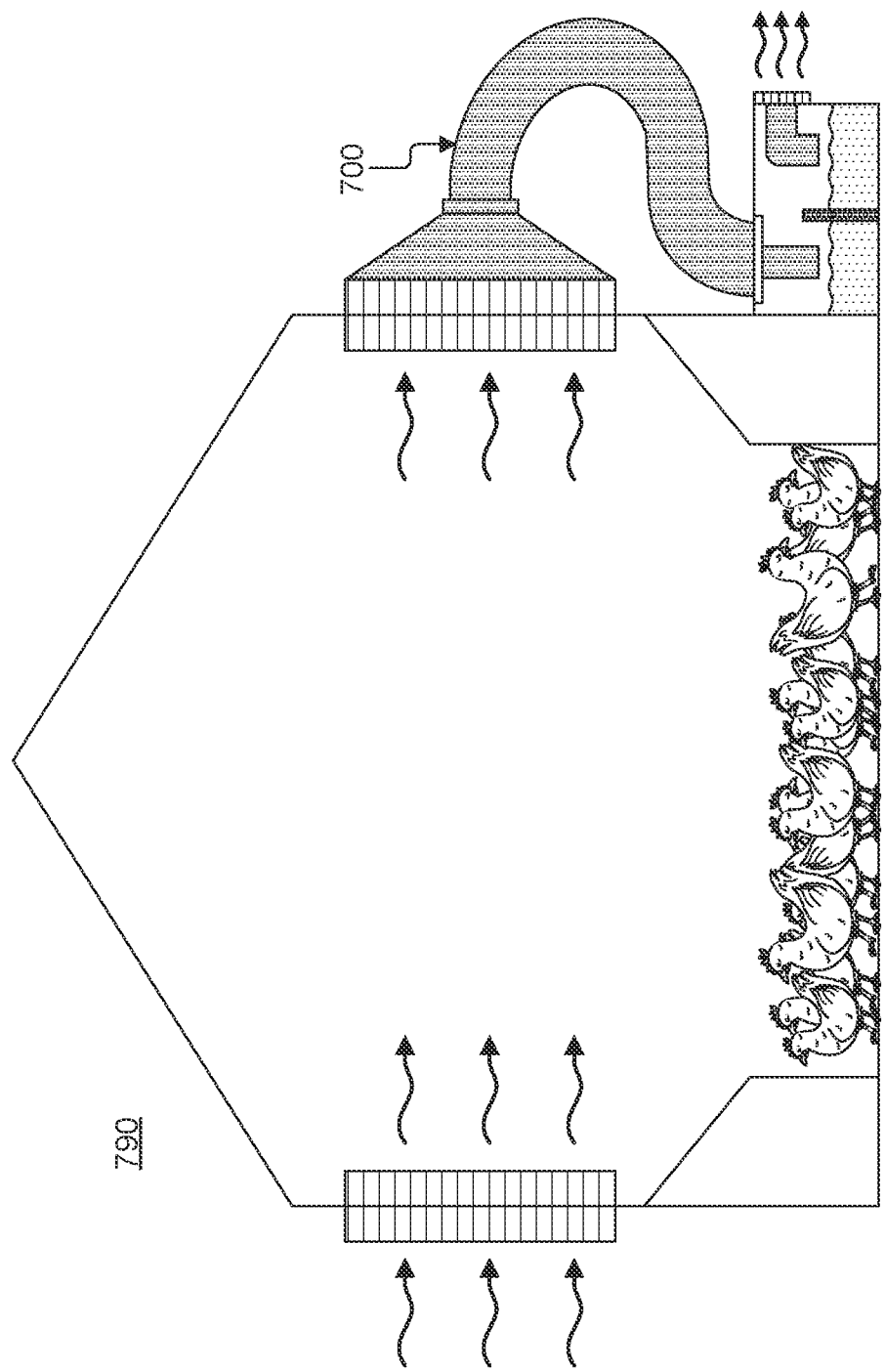
FIG. 7 illustrates an exemplary carbon capture adapter attached to a high air flow system, according to some embodiments of the present disclosure.

Referring now to FIG. 7, an exemplary carbon capture adapter 700 attached to a high airflow system 790 is illustrated. In some aspects, the high airflow system 790 may comprise airflow through a poultry farm. Large amounts of air are often flowed through a poultry farm to maintain a predefined temperature of the farm. The airflow may be caught by the carbon capture adapter 700 and the air scrubbed of carbon. Poultry and other livestock being in a containment facility will produce larger amounts of carbon. The carbon capture apparatus may be attached to the output of these livestock farms, similar to the bitcoin farm or datacenter to then remove or scrub the carbon from the ambient air.

Figure 8:
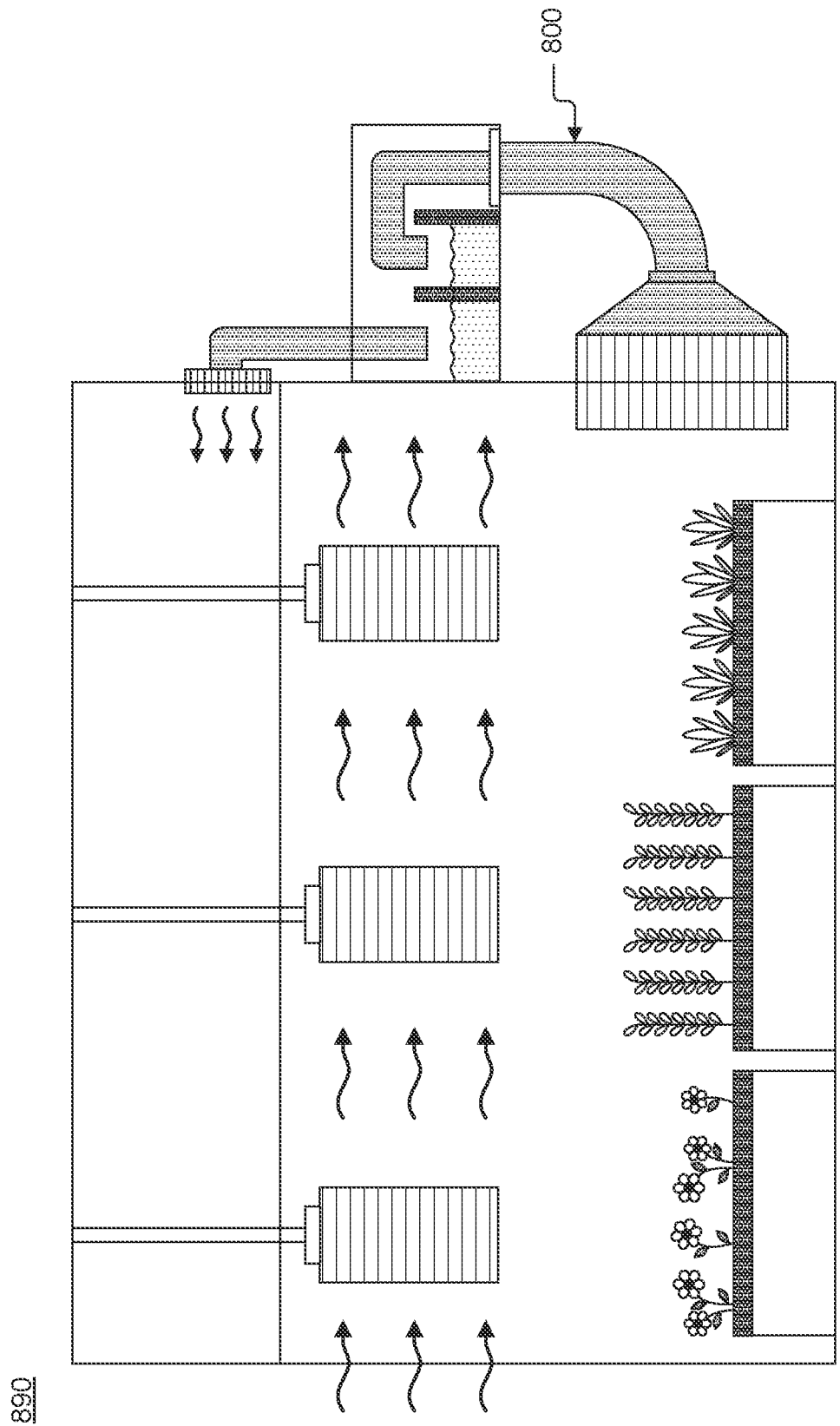
FIG. 8 illustrates an exemplary carbon capture adapter attached to a high air flow system, according to some embodiments of the present disclosure.

Referring now to FIG. 8, an exemplary carbon capture adapter 800 attached to a high airflow system 890 is illustrated. In some implementations, the high airflow system 890 may comprise the greenhouse itself without a direct attachment to an internal fan. In some aspects, a series of fans within a greenhouse may flow air throughout the enclosure causing passive waves of air that may be directed through a carbon capture adapter 800.

The carbon sink and may be sequestered to inject carbon directly back into the green house and cause a recirculating effect which is an organic symbiosis to recirculate the carbon captured back and this should be considered carbon recycling as the plants will absorb the carbon and the green has in effect becomes a recirculating carbon chamber. This will aid in vegetation growth that there will be higher levels of carbon dioxide in the green house recirculating as the carbon adapter is passing through the ambient air and recirculating it with higher levels of CO2.

Figure 9:
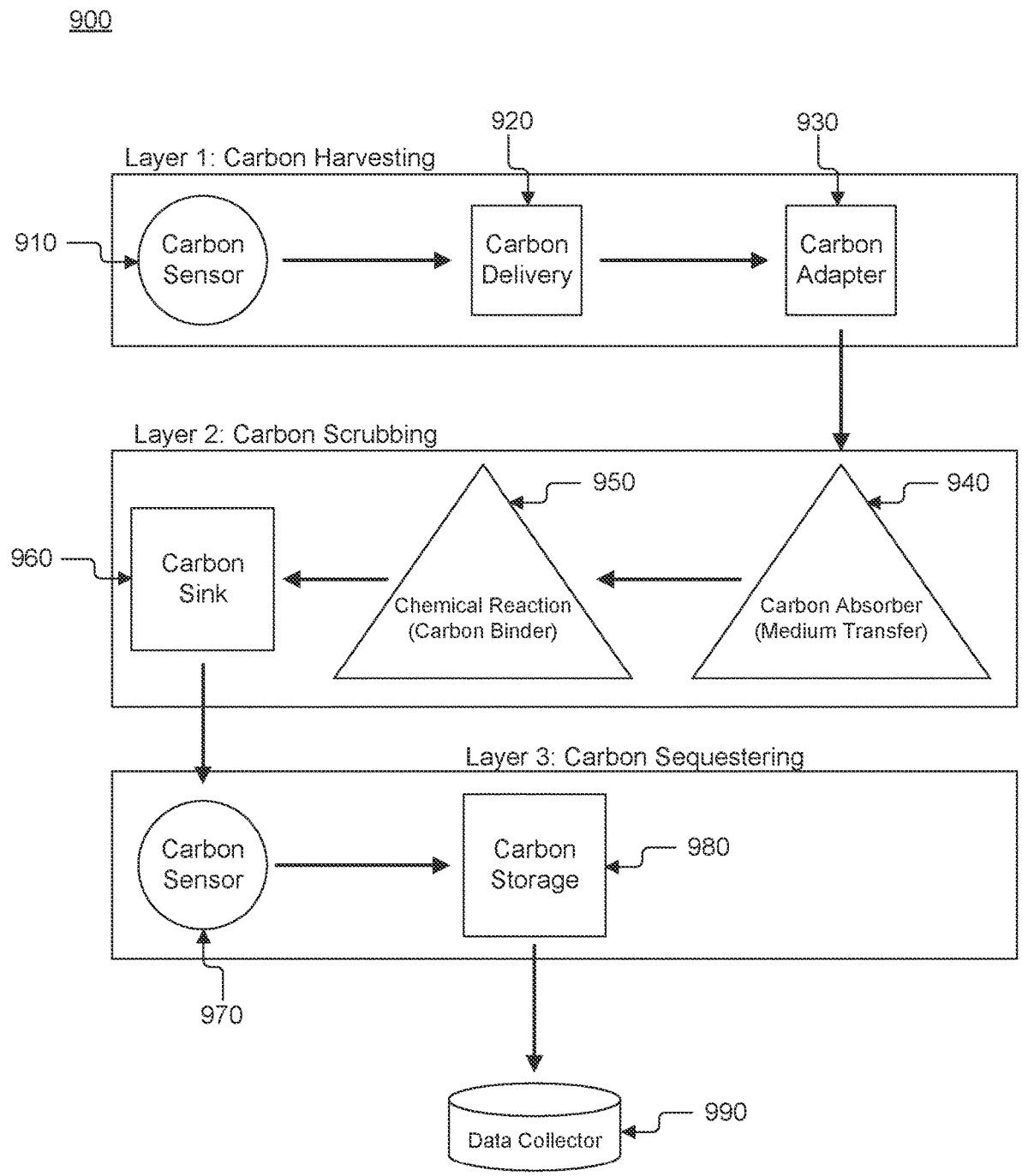
FIG. 9 illustrates an exemplary carbon capture process flow, according to some embodiments of the present disclosure.

Referring now to FIG. 9, an exemplary carbon capture process flow 900 is illustrated. As an illustrative example, a bitcoin miner, bitcoin farm, livestock farm, and other industrial applications may serve as an output of ambient air which. At 910, the carbon sensor may be placed in front of the fan, turbine or airflow of the bitcoin farm, livestock farm, and other industrial applications. This sensor may detect the amount of carbon entering in the system and may be calculated in ppm. At 920, the bitcoin miner, bitcoin farm, livestock farm, and other industrial applications itself in this example may be the carbon delivery device, which also serves as the high air flow system. At 930, an adapter shroud may be placed on the output or the exhaust part of the bitcoin miner, bitcoin farm, livestock farm, and other industrial applications.

At 940, duct work may then create a chamber to capture the airflow to start the chemical reaction where the ambient air may be forced upon and react against the chemical filter of potassium hydroxide or other hydroxide agent in an aqueous solution thus creating the next step. At 950, the chemical reaction of an alkali salt such as potassium hydroxide (metal) in an aqueous solution may attract a bonding experience where the carbon dioxide may change mediums from air to liquid because of the chemical bond. The heat produced from the miner and the chemical reaction may aid in this process. Heat to eat integration may be used in the form of a bitcoin miner, industrial heat byproducts and other wasted heat from other products or processes in the system.

At 960, this reaction may take place in a holding tank, reservoir, chamber, enclosure, filtration system that creates a carbon sink. At 970, the exhaust where the ambient air from 920 may now be released into the atmosphere may leave the carbon sink causing the necessary bonding reaction to attract the carbon into the aqueous solution so that the output may have less carbon than first entering the system and the process flow. This is where a second sensor may take another reading and send the data to the controller board. In this example there may be a controller board from the 920 carbon delivery device that can be integrated with or a controller board that may be needed separate as shown in the previous FIG. 480.

At 980, the sequestering process can take place and this may be the removal of the filter that now has stored carbon in it and replacement of the filter or more potassium hydroxide or other hydroxide. The reaction may form potassium bicarbonate or another bicarbonate in the filter and now is ready for the extraction of this material for real world applications and uses of the potassium bicarbonate or other bicarbonates or to convert it to pure carbon to be delivered to another system.

At 990, data may be sent to the controller board to allow feedback in a closed loop system to take place. This may allow for control of fan speed in the input or output to change. This may allow the CFM or the amount of carbon entering the closed loop system to be more or less per minute. The feedback also may control the concentration of the potassium hydroxide or other hydroxide to be more or less entering the absorber and filter process. The feedback may alert an error or may alert that the system has low potassium hydroxide or other hydroxide that an end user or integration may need to add more.

The controller board may also be able to detect that the filter and absorber may not be able to absorb any more carbon and the filter may need to be changed and replaced. The control board may be able to collect in real time and keep a history of how much carbon has been captured, scrubbed and removed from the air giving it integration capabilities through the methods of an API or equivalent data integration technology to be able to use and send the data and use this information in the future for carbon credits.

Figure 10:
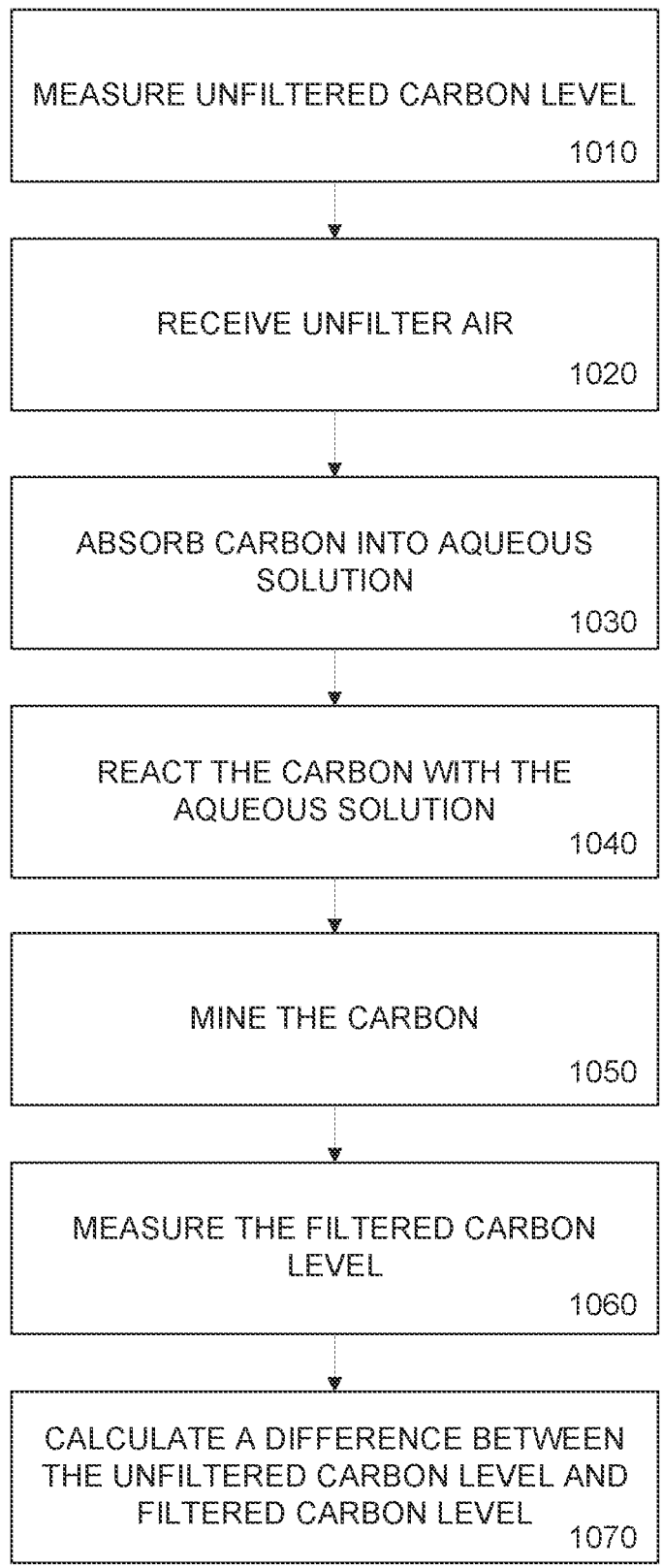
FIG. 10 illustrates an exemplary method for carbon capture utilizing a carbon capture adapter, according to some embodiments of the present disclosure.

Referring now to FIG. 10, exemplary method steps 1000 for capturing carbon from a high air flow system are illustrated. At 1010, the carbon level of unfiltered ambient air from a high air flow system may be measured, and at 1020, unfiltered air may be received. At 1030, carbon may be absorbed into an aqueous solution. At 1040, the carbon may react with the aqueous solution to cause a medium transfer and chemical binding reaction. At 1050, the collected carbon may be mined or extracted. At 1060, the carbon level of the filtered ambient air may be measured. At 1070, the difference between the carbon levels may be calculated.

Figure 11:
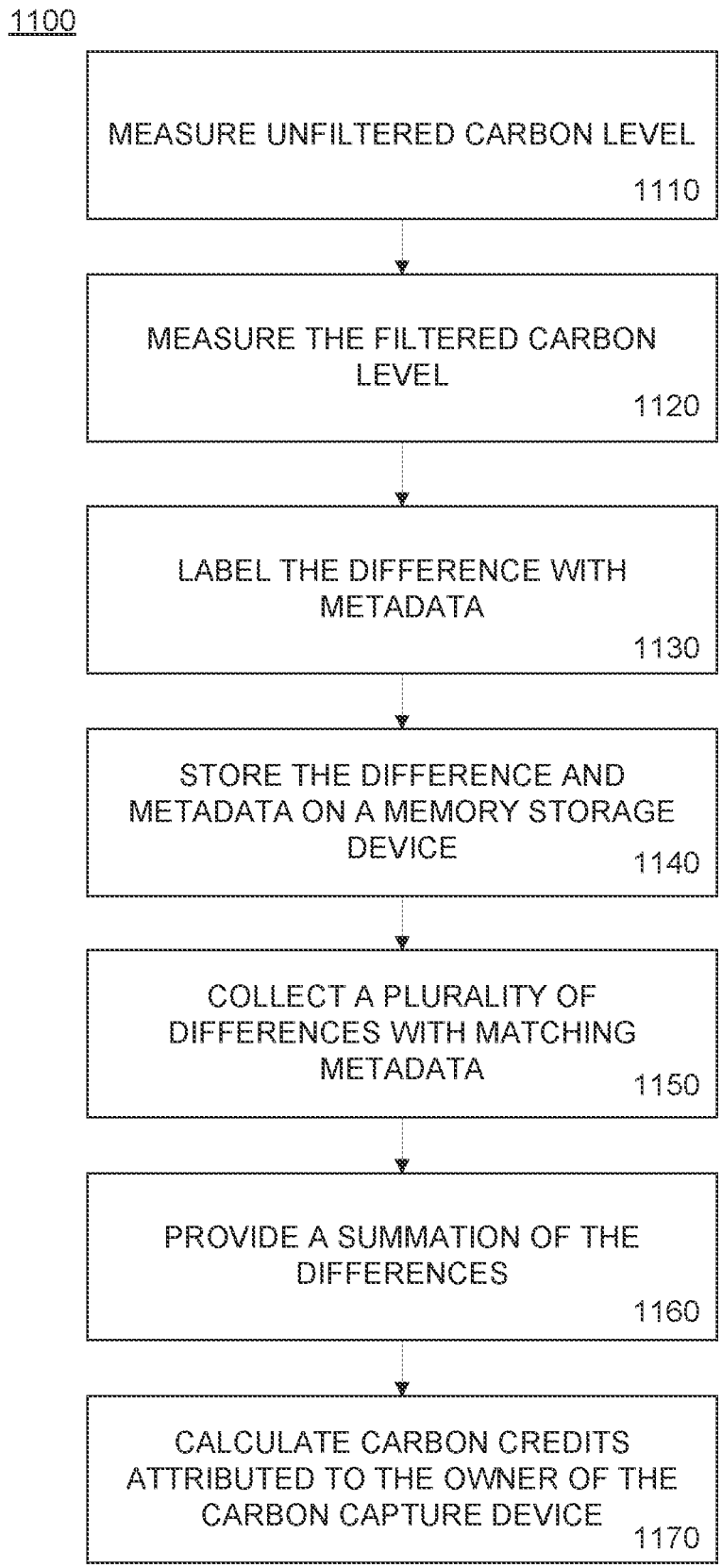
FIG. 11 illustrates an exemplary method of calculating carbon capture utilizing a carbon capture device, according to some embodiments of the present disclosure.

Referring now to FIG. 11, exemplary method steps 1100 for calculating carbon capture is illustrated. At 1110, the carbon level of unfiltered air from a high air flow system may be measured. The ambient air may pass through a carbon capture device, and at 1120, the carbon level of filtered air may be measured. At 1130, the calculated difference may be labeled with metadata. This metadata to be used is input carbon ppm, output carbon ppm, input air cfm At 1140, the calculated difference and the metadata may be stored on a memory storage device, such as blockchain, database, ledger, flatfile, spooling on text file among other data collection, storage and archiving.

At 1150, a plurality of differences in carbon levels may be collected and stored. At 1160, the plurality of differences may be summed, and at 1170, the summation may be used to calculate carbon credits attributed to the owner of one or both the high air flow system and the carbon capture device. In some embodiments, the summation comprises data sufficient enough to create real time, almost real time, and historical carbon credits attributed to the meta data.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, re-ordering, recirculating, multitasking and parallel processing may be advantageous.

Moreover, the separation of various system components in the embodiments described above should not be understood as requiring such separation in all embodiments, and it should be understood that the described program components and systems can generally be integrated together in a single operational unit, software product or packaged into multiple software products or CCS products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A carbon capture adapter comprising:
a collection portion attachable to a high air flow system;
a closed loop air system connected to the collection portion, wherein unfiltered ambient air received through the collection portion flows through the closed loop air system; and
a direct air carbon capture removal system, wherein the carbon removal system comprises:
a container portion comprising a first opening and a second opening, wherein the first opening is connectable to the closed loop air system, wherein unfiltered ambient air received through the closed loop air system flows through the first opening into the container portion;
a first sink located within the container portion, the first sink configured to contain a replaceable substance to bind with carbon in the unfiltered air received from the closed loop air system to create a first captured carbon substance and release of filtered air into the atmosphere;
a removable filter located within the first sink, wherein the filter collects the first captured carbon substance; and
an exit air system connectable to the second opening, wherein the filtered air exits the carbon capture removal system through the second opening and the exit air system.

2. The carbon capture adapter of claim 1, further comprising:
an unfiltered ambient air carbon sensor located proximate to the unfiltered ambient air, wherein the unfiltered ambient air carbon sensor detects an unfiltered carbon level in the unfiltered ambient air received through the closed loop air system; and
a filtered ambient air carbon sensor located proximate to the second opening, wherein the filtered air sensor detects a filtered carbon level in the filtered ambient air received through the closed loop direct air carbon capturing system.

3. The carbon capture adapter of claim 2, wherein the unfiltered ambient air carbon sensor and the filtered ambient air carbon sensor are in bi-directional data communication of carbon capture data through a controller board.

4. The carbon capture adapter of claim 3, wherein the unfiltered ambient air carbon sensor periodically collects the unfiltered carbon level and transmits the unfiltered carbon level to a carbon data controller, the filtered air sensor periodically collects the filtered carbon level and transmits the filtered carbon level to the carbon data controller, and the carbon data controller compares the filtered carbon level to the unfiltered carbon level to calculate carbon removal data.

5. The carbon capture adapter of claim 4, wherein the carbon data controller is in communicable connection with a memory storage device, and wherein the carbon data controller periodically transmits carbon removal data to the memory and data storage device.

6. The carbon capture adapter of claim 5, wherein the memory and data storage device comprises blockchain, database, ledger, flatfile, spooling on text file among other data collection, storage and archiving.

7. The carbon capture adapter of claim 2, further comprising a carbon data controller.

8. The carbon capture adapter of claim 1, wherein the replaceable substance comprises a hydroxide and wherein the first carbon captured substance results in a bicarbonate.

9. The carbon capture adapter of claim 1, wherein the replaceable substance comprises a liquid that contains algae or microbe, when in contact with a carbon-based substance, creates algae or microbe growth through carbon storage.

10. The carbon capture adapter of claim 1, wherein the exit air system comprises a carbon capture exit fan configured to flow filtered ambient air from the container portion.

11. The carbon capture adapter of claim 1, wherein the high air flow system comprises a bitcoin miner machine.

12. The carbon capture adapter of claim 1, wherein the high air flow system comprises a bitcoin miner container housing a plurality of bitcoin miner machines.

13. The carbon capture adapter of claim 1, wherein the high air flow system comprises a greenhouse that houses vegetation.

14. The carbon capture adapter of claim 1, wherein the high air flow system comprises a livestock facility that houses livestock.

* * * * *